Figure 1:
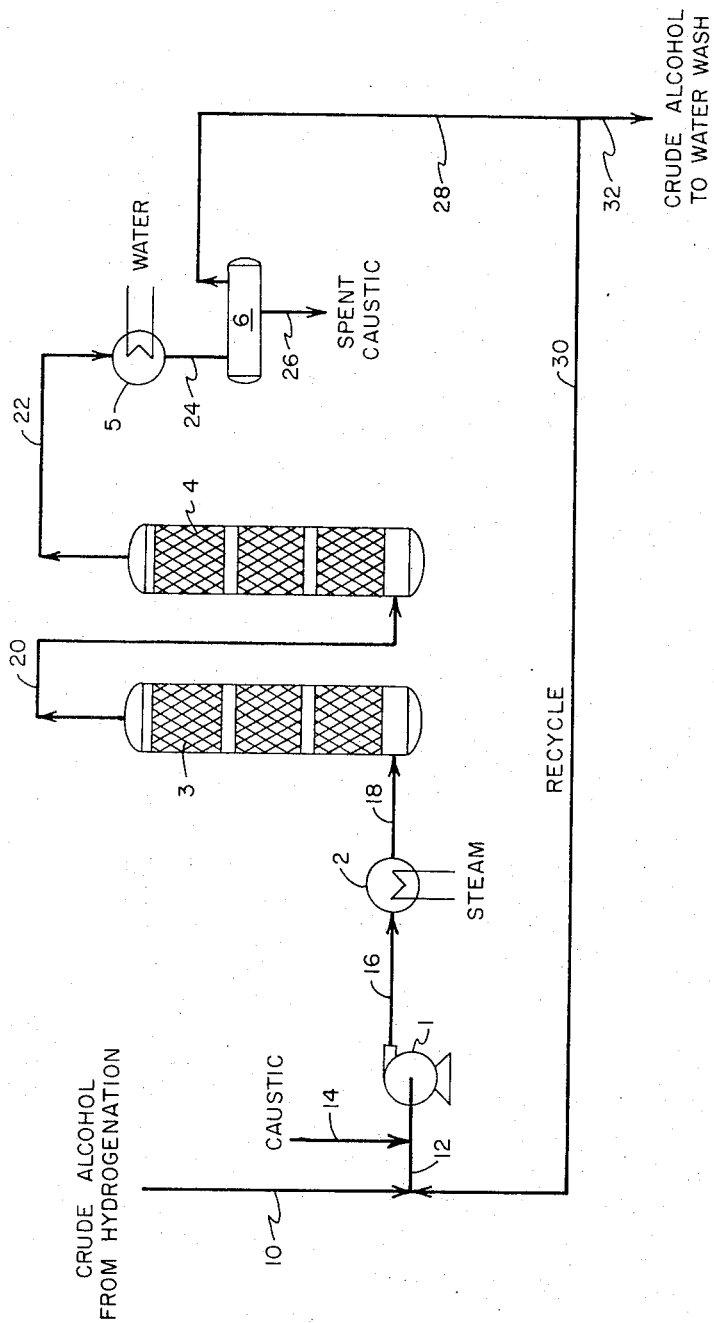

Dec. 19, 1967     C. ROMING, JR     3,359,335
CAUSTIC SCRUBBING OF ALDOX ALCOHOLS
Filed May 13, 1964

CHARLES ROMING, JR.    INVENTOR

United States Patent Office 3,359,335
Patented Dec. 19, 1967

3,359,335
CAUSTIC SCRUBBING OF ALDOX ALCOHOLS
Charles Roming, Jr., Towaco, N.J., assignor to Esso Research and Engineering Company, a corporation of Delaware
Filed May 13, 1964, Ser. No. 367,108
8 Claims. (Cl. 260—643)

The present invention relates to the treatment of alcohols, particularly with respect to purification of finished alcohol product. More specifically, the present invention is directed toward the purification of alcohol products obtained by the catalytic carbonylation of olefins with hydrogen and carbon monoxide to give a reaction mixture predominantly made up of carbonyl compounds followed by catalytic hydrogenation under conditions conductive to obtain substantially complete conversion of carbonyl groups to alcoholic hydroxyl groups.

This invention is directed to a highly specific and extremely useful treatment which has been found to give pure alcohol products from crude hydrogenated materials derived from synthetic carbonylation and hydrogenation processes. It consists primarily of a caustic treatment under conditions of temperature and time, such that certain ester and acid impurities are removed from the alcohol (e.g. the esters of formic acid) followed by recycle of at least a portion of the alcohol to the initial caustic treatment. Such recycle is found to be imperative, in order to obtain the maximum good results possible from the process.

One important commercial carbonylation process involves the synthesis of oxygenated organic compounds from olefinic compounds and mixtures of carbon monoxide and hydrogen under suitable oxonation conditions and is well known in the art. The olefinic starting material in this process is reacted in the liquid state with carbon monoxide and hydrogen in the presence of a metal catalyst, usually an iron group metal catalyst, such as a suitable cobalt compound to form, in a first stage, organic carbonyl compounds such as aldehydes and ketones having one carbon atom more per molecule than the olefinic feed material together with lesser amounts of higher molecular weight condensation-type products such as acetals, hemiacetals, dimer aldehydes, and esters. The carbonyl compounds which predominate in the product are then subjected to hydrogenation in a second stage to produce the corresponding alcohols, usually in a rather impure state.

Practically all types of organic compounds having an olefinic double bond may be used as starting materials to the first or oxonation stage including aliphatic olefins and diolefins, cyclo-olefins, aromatics with olefinic side chains, oxygenated compounds having olefinic double bonds, etc. The metal catalyst is preferably introduced to the reaction zone as an oil soluble salt, for instance, as a fatty acid salt such as the naphthenates, stearates, oleates, etc. of cobalt. Suitable reaction conditions include temperatures of about 150–450° F., pressures of about 100 to 300 atm., synthesis gas with $H_2$:CO ratios of about 0.5 to 2.0:1, liquid feed rates of about 0.2 to 2 v./v./hr. and gas feed rates of about 1000 to 45,000 standard cu. ft. of $H_2$+CO per barrel of liquid feed.

The hydrogenation stage may be operated at conventional hydrogenation conditions which include temperatures, pressures, gas and liquid feed rates approximately within the ranges specified above for the first stage. Various known types of hydrogenation catalysts such as nickel, tungsten, molybdenum, their oxides and sulfides and others may be used. These catalysts may be supported on a suitable carrier such as charcoal or other inert support. The liquid product from the hydrogenation stage is worked up by distillation to separate the desired alcohols from unconverted olefinic feed material, unhydrogenated carbonyl compounds, hydrocarbons, and condensed higher molecular weight products formed in the process.

An increasingly important commercial process also involves the conversion of lower olefins but converts them into aldehydes and alcohols having more than twice as many carbon atoms as the original feed. Essentially this modification of the above disclosed oxo process involves reaction of the olefin with carbon monoxide and hydrogen in the presence of a cobalt carbonylation catalyst at elevated temperature and pressure whereby the olefin is carbonylated to give an aldehyde and an alcohol having one more carbon atom than the original olefin. The aldehyde resulting from this oxo synthesis is then dimerized and dehydrated by an aldol reaction in the presence of a dimerization-dehydration catalyst such as a compound of zinc, beryllium, magnesium or barium. In this manner aldehydes having twice as many carbon atoms as the intermediate aldehyde are obtained.

The dehydro-aldolization step can be and preferably is carried out directly in the carbonylation stage by including a catalyst such as zinc as well as cobalt in the oxo synthesis mixture. Alternatively, the dimerization may be carried out by subjecting the crude aldehyde effluent from a conventional oxo stage to aldolization and dehydration in the presence of zinc or the like in a separate stage. For convenience, both of these alternative oxo-aldol combination processes will be referred to herein generically as the "aldox process" or the "aldox synthesis." In either case, the resulting dimeric aldox aldehyde can be hydrogenated to give the corresponding alcohol. Thus, for instance, propylene can be converted to 2-ethylhexenal and 2-ethylhexanal and eventually to 2-ethylhexanol, butyraldehyde being the intermediate oxo aldehyde which is aldolized. Since the crude aldox product in either case contains objectionable cobalt and zinc or other catalytic metal residues, these must also be thoroughly removed to assure that the final alcohol product will meet stringent commercial specifications.

The over-all oxo or so-called "Aldox" reactions as outlined above, provide a particularly effective method for preparing valuable primary alcohols, particularly of the $C_4$ to $C_{16}$ range, which find large markets as intermediates for detergents and plasticizers.

While alcohols produced by these processes are known to be suitable for the preparation of detergents and plasticizers, their use for this purpose has been handicapped to a large extent by the fact that such synthetically produced alcohols often contain varying amounts of complex impurities and contaminants which render impossible the production of substantially colorless esters for use as plasticizers. As far as can be ascertained, the potential color inducing impurities present in synthetic alcohols are extremely complex in nature and are generally thought to be contaminating amounts of aldehydic and unsaturated compounds which are introduced into the alcohol by its method of manufacture. It is known, for example, that when oxo or aldox reaction mixtures are hydrogenated to produce alcohols by either a liquid phase or vapor phase hydrogenation, the acetals present in the oxygenation reaction mixture essentially do not hydrogenate and some of the aldehydes polymerize. Moreover, the alcohol fraction is likely to be contaminated with high boiling esters, acetals, ethers, etc., as well as decomposition products boiling within the range of the alcohol boiling range. When such alcohols are subjected to distillation, measurable amounts of organic contaminants and color-forming impurities are distilled over with the alcohol fraction and are likewise present even when the alcohol is subjected to a redistillation.

In order to overcome these handicaps, various methods have been suggested for refining synthetic alcohol products for the purpose of removing undesirable contaminants and color-forming impurities which would otherwise seriously limit the utility of such alcohols in their field of application. Known prior art methods include, for example, the treatment of crude alcohols with a caustic solution to effect condensation of aldehydic impurities and saponification of esters, thereby providing a partially purified product, and numerous other solvent and distillation techniques.

More recently, in U.S. Patent 2,626,284 there is disclosed a method for the purification of alcohol products obtained from the Aldox synthesis in which an impure alcohol is treated with caustic, is subsequently water washed, and is thereafter distilled. Although some of these methods provide a reduction in residual impurities contained in synthetic alcohols, such processes have been limited by the expense involved in providing a sufficient yield of a purified product, or by a general ineffectiveness in refining the alcohol to the extent required for its intended purpose as hereinbefore mentioned. Many of the synthetic alcohols find wide applications as esterification alcohols in the preparation of plasticizers and hence it is commercially important that both the alcohol and their chemical derivaitves be substantially free of organic contaminants and color-forming bodies.

Even more recently in Canadian Patent No. 630,196 there is disclosed a method which comprises subjecting a crude alcohol containing undesirable contaminants and color-forming impurities to a sequence of treatments which involve contacting the alcohol with an aqueous caustic solution to provide a organic phase of partially purified alcohol and an aqueous phase containing soluble caustic compounds of impurities removed from the alcohol, water washing the organic phase, stripping the water washed alcohol of high boiling materials, and thereafter subjecting the stripped alcohol to a refining distillation with rectification. Thus while various methods have been studied in order to solve these quality difficulties, no good method, however, has previously been known for effecting purification of the alcohol product to essentially completely remove ester and acidic impurities and thereby produce an alcohol product which yields high quality ester products when esterified with organic acids.

It is an object of this invention, therefore, to effect the substantially complete removal of organic contaminants and color forming impurities from synthetically produced alcohols. A further object is to provide a high-quality synthetic alcohol which when esterified will produce a plasticizer ester having substantially no color or odor. Other objects will be apparent from the following description.

The above and other objects for refining crude synthetically produced alcohols in accordance with the invention are accomplished by contacting a caustic solution with the crude alcohol in an initial caustic treatment stage under conditions of temperature and time such that the organic contaminants and color forming impurities are removed from the alcohol by a high temperature caustic scrubbing step and recycling at least a portion of the resulting purified alcohol product to the initial caustic treatment stage.

In following this invention the crude alcohol is contacted with a caustic solution in order to effect purification, particularly of acidic materials and ester products derived from formic and acetic acids. Although the caustic process can be applied to more or less "finished" alcohol products, it is considered best practice from an economic viewpoint that the caustic treatment is preferably applied immediately or as soon as convenient following the production of the crude alcohol in the hydrogenation stage. This prevents the formation of additional condensed impurities such as acetals which are believed to be produced at least partly as a result of the catalytic activity of acidic impurities in the alcohol.

The caustic most suitable for the treatment is an aqueous sodium hydroxide solution of about 5–15 wt. percent concentration although caustic, concentrations of the range of 3 to 30 wt. percent can be employed. Very low concentrations can lead to emulsion problems whereas high concentrations lead to contacting problems. Although it is best to employ the caustic in solution, it is also possible to use solid sodium or potassium hydroxide as the treating material. In some instances for better contact by solubility of the alcohol phase and the treating solution a non-aqueous solution of the caustic can be employed, as an alcohol solution. The terms caustic and alkali as used herein are intended to have their usual meaning as applied in chemical and general industrial operations. The terms are intended to include particularly aqueous solutions of the alkali metal hydroxides, for example, potassium and preferably sodium hydroxide, which form water soluble alkali metal compounds of various alcohol impurities. These soluble compounds are removed from the alcohol either as dissolved substances in the aqueous caustic wash or during subsequent washing.

During the treatment step certain impurity constituents and particularly acidic and ester compounds which are in the alcohol are transformed into materials which are soluble in the aqueous media. These soluble impurities pass into said media when the alcohol is treated with the caustic solution.

The caustic solution should be contacted with the crude alcohol being treated in such a manner as to assure very fast and thorough mixing of the two phases, but at the same time avoiding emulsion formation. It may be advantageous to add an emulsion inhibitor in order to prevent subsequent difficulties in separation of the two phases. For continuous operations a countercurrent tower extraction process can be employed although for best results an orifice or staged turbo-mixer, which give very intimate contact, are considered to be the best. Some types of propeller mixers are also suitable.

The two-phase caustic-alcohol system is introduced into a co-current flow contact zone wherein the scrubbing action is effected. Said zone may comprise one or a series of contact vessels, e.g. one or more towers. For advantageous results, each vessel is packed with noncatalytic material, such as Raschig rings, porcelain chips, ceramic material, pumice, and the like. In addition, each vessel may be divided into discrete packed zones separated by redistributing and recontacting means, such as support grids, perforated plates, etc., or it may comprise but a single packed zone. While not preferable, a vessel may contain no packing.

The time of contact in said contact zone necessary to produce a good quality alcohol by removal of substantially all or at least the most undesirable impurities varies, depends on the concentration and kind of impurities in the alcohol as well as on the concentration and temperature conditions of the caustic washing solution. For instance, the stronger the caustic solution and the higher the temperature, the less time of contact required for obaining excellent quality alcohol. A contact time of an hour or less has been found effective at the usual operating conditions while with less drastic treating conditions and a more impure alcoholic feedstock the time for effective treatment may be lengthened to as much as 3 hours.

The temperature at which the high temperature scrubbing operation is carried out is considered to be somewhat critical in that a sufficiently elevated temperature must be employed in order to provide a treating operation which will yield the desired product quality improvement. On the other hand, excessively high temperatures will lead to further undesirable side reactions, such as aldol condensation, which can adversely affect yields. Markedly better results are manifested when the caustic scrubbing operation is carried out at temperatures above 150° F. and preferably between 250° F. and 350° F. The optimum scrubbing temperature is directly related to the time of contact as well as to the amount and kind of impurities which are present in the original crude alcohol.

The ratio of caustic solution to the particular quantity of alcohol employed in the scrubbing operation is not critical. However, it is of prime importance to use sufficient caustic to effect removal of substantially all the alkali sensitive impurities. Thus, there must be enough alkali to form salts with any acidic type containing impurities, to hydrolyze the esters present, and to remove as soluble salts the acids so formed during the hydrolysis. A large excess will be uneconomical and can cause loss of alcohol product. Generally, caustic treat rates of 50 to 400 percent by volume based on the crude alcohol are satisfactory.

The scrubbing can generally be carried out at or near atmospheric pressure. However, specifically in the production of octyl alcohols, if the operation is done using crude alcohol at 300–350° F. then some pressure will be necessary to keep unreacted olefins and hydrocarbons from the oxonation stage in liquid phase since they boil at about 200° F. Superatmospheric pressures of from 50 to 100 p.s.i. are adequate. If high temperature treatments are used, superatmospheric pressures may be necessary to keep the alcohol itself in a liquid state. The crude alcohol product is rendered relatively free of normally gaseous by-products by a degassing operation prior to the caustic washing; this degassing removes hydrogen, low boiling hydrocarbons, and other light materials.

It is contemplated to be within the scope of this invention to carry out successive caustic treatments on the alcohol since in a majority of instances the alcohol undergoing treatment will be water-immiscible, and therefore, relatively insoluble in the caustic solution, the alcohol and caustic mixture is taken to a phase separator or settling tank in which there are formed two phases, an aqueous caustic phase containing the dissolved impurities removed from the alcohol, and an organic phase of the purified alcohol.

The aqueous phase is separated and reused as wash liquid, if desired, and the alcohol, by the preferred mode of operation, may be subjected to at least one water washing to further remove caustic and solubilized impurities.

In accordance with the present invention, at least a portion, suitably about 25 to 75 percent by volume and preferably 50 to 67 percent by volume, of purified alcohol is withdrawn from the remaining total organic phase of the purified alcohol. Said separated portion is recycled to the initial caustic contact step wherein it is injected into crude alcohol from the hydrogenation stage prior to contacting with the caustic solution.

The types of alcohol feedstock best adapted and generally those most requiring this type of specific caustic treatment are crude alcohol mixtures derived from the so-called Aldox process which are water-immiscible. This range generally includes alcohols above $C_4$ and up to those of the $C_{16}$ range. It is contemplated that the process will have the widest application to purify Aldox alcohols of the $C_6$ and $C_{12}$ range which are exactly those alcohols of most useful and desirable properties for making ester plasticizers. For instance a typical $C_8$ feedstock which can be purified by this caustic treatment to give a product yielding an ester plasticizer of high purity with both decreased color and odor characteristics may be characterized as one produced from oxo synthesis using a $C_7$ olefin feed, the resulting crude alcohol having a boiling range of 150° F. to 400° F., and consisting essentially of 25% light ends which are mostly hydrocarbons and aldehydes, 60% alcohol boiling at 300–372° F. and 15% bottoms. The alcohols are branched chain isomers of octyl alcohol and are of the primary class, e.g. 2–3 dimethyl hexanol-1. Another typical $C_8$ feedstock which can be purified by this caustic treatment to give a product yielding an ester plasticizer of high purity with both decreased color and odor characteristics may be characterized as one produced from Aldox synthesis using propylene feed wherein the Aldox reactor effluent is distilled into a $C_4$ aldehydic fraction and a $C_8$ aldehydic fraction which is thereupon hydrogenated separately to the respective crude alcohol fractions. The resulting crude $C_8$ alcohol fraction has a boiling range of about 200° F. to 450° F. and consists essentially of 10% light ends which are mostly hydrocarbons and aldehydes, 85% $C_8$ alcohol boiling at 345–365° F. and 5% bottoms. The $C_8$ alcohols are branched chain isomers of octyl alcohol and are of the primary class, consisting essentially of a 1/8 ratio of 2-ethyl-4-methyl pentanol-1 or 2-ethyl isohexanol and 2-ethyl hexanol.

The preferred form of the invention involves its application to a continuous process for the caustic scrubbing of 2-ethyl hexanol or admixtures of 2-ethyl hexanol with 2-ethyl isohexanol and the use of co-current flow packed towers in series or a staged turbo-mixer type contactor. The packed tower form is illustrated in the figure.

Referring to the figure, a crude iso-octyl alcohol product having the above-outlined characteristics is continuously introduced via lines 10 and 12 into centrifugal pump 1.

Two hundred volume percent, based on the alcohol, of a 5.5 weight percent aqueous sodium hydroxide solution is supplied through line 14 into line 12 from whence it is introduced along with the crude alcohol product into pump 1. In said pump 1 the mixture is contacted at an average temperature in the range of 70 to 100° F. The mixture is then pumped through heat exchanger 2 via line 16 wherein the temperature of the caustic and alcohol mixture is raised to a temperature of between about 300 to 340° F.

An effective embodiment of this invention involves the use of two or more packed towers operating in series. In this embodiment the heated mixture is fed through line 18 and injected into the bottom of packed tower 3. Said tower is 35 feet high, has an inside diameter of two feet and is packed with Raschig rings contained in three beds which are 10 feet each. Thus, tower 3 comprises approximately 175 cubic feet of void volume. The caustic solution-crude alcohol mixture is passed through tower 3 while being maintained at a pressure of 50 p.s.i.g. and a temperature of between 300–340° F. and is removed from the top of said tower and injected at the bottom of tower 4 by means of line 20. Tower 4 is constructed and packed in a manner similar to tower 3 and the mixture passing therethrough is maintained at a pressure of 50 p.s.i.g. and a temperature of between 300–325° F. The total residence time of the mixture in towers 3 and 4 in this embodiment is about 1 hour.

The scrubbed mixture is removed from the top of tower 4 via line 22 and is cooled in cooler 5 to a temperature of about 120° F. The cooled mixture is then introduced to separation tank 6 by means of line 24. In said tank the mixture forms into two phases viz. the aqueous caustic and the organic purified alcohol. From the bottom of separation tank 6 spent aqueous caustic is removed and disposed with in accordance with conventional procedures.

According to this invention, the organic purified alcohol phase is removed from tank 5 through line 28. Herein separation of the removed alcohol stream occurs with at least a portion of the stream being recycled to line 10 through line 30. In this embodiment, 65 volume percent of the organic purified alcohol phase is recycled back to the initial caustic treatment step. The remaining organic purified alcohol phase is passed through line 32 for subsequent treatment if desired, for example, water washing and possible distillation.

The process of the present invention may be further illustrated by the following specific examples.

*Example 1*

In order to demonstrate the feasibility of employing an organic purified alcohol recycle on a plant scale, the following runs were effected according to the method hereinbefore set forth. The feed employed in all of said runs was crude $C_8$ alcohol fraction resulting from an Aldox process as hereinbefore described. For purposes of convenience the data are set forth in the following Table I which shows the superiority of the recycle of the instant invention.

TABLE I

Contact Conditions:
  Temperature, °F.:
    In ----------------------------------------------- 332–340
    Out ---------------------------------------------- 312–322
  Caustic Conc., Wt. Percent ------------------------- 5.5–6.0
  Water Wash Rate, Vol. Percent ---------------------- 118–125

| Run No. | 1 | 2 | 3 | 4 | 5 |
|---|---|---|---|---|---|
| Fresh Feed Rate, Bbls./Day | 125 | 125 | 128 | 127 | 125 |
| Holdup Time, Hrs. | 2.1 | 1.7 | 1.3 | 0.95 | 1.1 |
| Caustic Treat, Vol. Percent on Fresh Feed | 180 | 242 | 340 | 342 | 328 |
| Recycle Rate, Vol. Percent on Fresh Feed | 0 | 0 | 0 | 180 | 137 |
| Saponification No.[1]: | | | | | |
| Fresh Feed | 17.3 | 11.9 | 4.6 | 11.0 | 9.3 |
| Treated Product | 8.7 | 4.4 | 2.7 | 1.4 | 1.4 |

[1] Measure of total ester content.

The above data indicate that by using alcohol recycle (Runs 4 and 5) a high degree of ester removal is effected which is necessary for producing high purity, e.g. 99.8–99.9 volume percent or higher, 2-ethyl hexanol.

What is claimed is:

1. In a process for purifying crude alcohol products obtained from carbonylation reaction followed by hydrogenation, which products contain organic contaminants and undesirable color-forming impurities, wherein a stream of said crude alcohol products from said reactions is introduced to a caustic contact zone and is contacted in said zone with from 50 to 400 volume percent, based on said crude alcohol stream, of a 3 to 30 wt. percent aqueous solution of an alkali metal hydroxide at a temperature in excess of 150° F. and at a pressure sufficient to maintain the alcohol products in the liquid state to obtain a purified alcohol phase and an aqueous phase comprising alkali metal salts of organic impurities, the improvement which comprises withdrawing the purified alcohol phase from the aqueous phase and admixing from 25 to 75 volume percent of the withdrawn purified alcohol phase with the crude alcohol stream being introduced to the said caustic contact zone prior to contact with the aqueous solution of the alkali metal hydroxide in the caustic contact zone.

2. A process for the treatment of a crude, substantially water-immiscible branched chain primary octyl alcohol produced by an oxo carbonylation reaction followed by hydrogenation yielding a crude product, predominantly alcoholic and containing impurities including acids, esters and particularly formic and acetic acid esters, which comprises introducing the crude alcohol to a caustic contact zone, contacting the crude alcohol in said caustic contact zone with from 50 to 400 volume percent, based on crude alcohol, of a 3 to 30 wt. percent aqueous solution of an alkali metal hydroxide at a temperature between 250 and 350° F. and at a pressure sufficient to maintain the alcohol in the liquid state, stratifying the mixture into a lower aqueous layer containing dissolved alkali metal hydroxide salts of the organic impurities and an upper purified alcohol layer, separating the thus purified alcohol layer from the aqueous layer, admixing from 25 to 75 volume percent of the separated purified alcohol layer with the crude alcohol being introduced to the said caustic contact zone prior to contacting said crude alcohol in said caustic contact zone with the said aqueous solution of the alkali metal hydroxide.

3. The method of claim 1 in which the crude alcohol is a $C_4$–$C_{16}$ primary alcohol.

4. The method of claim 1 in which the aqueous solution of an alkali metal hydroxide comprises an aqueous sodium hydroxide solution of 5 to 15 wt. percent concentration.

5. The process of claim 2 in which the carbonylation reaction is an Aldox reaction.

6. The process of claim 2 in which said purified alcohol recycle stream comprises from about 50 to 67 volume percent of the purified alcohol phase.

7. The process of claim 6 wherein said alkali metal hydroxide is sodium hydroxide and the aqueous solution employed contains from 5 to 15 wt. percent sodium hydroxide.

8. The process of claim 4 wherein said alkali metal hydroxide is sodium hydroxide.

References Cited

UNITED STATES PATENTS

| | | | |
|---|---|---|---|
| 2,626,284 | 1/1953 | Smith | 260—643 |
| 2,663,426 | 12/1953 | Wilson et al. | 260—643 |
| 2,755,317 | 7/1956 | Kassel | 260—690 |
| 2,830,095 | 4/1958 | Nicolaisen | 260—634 |
| 3,230,156 | 1/1966 | Katzen | 260—643 |

LEON ZITVER, *Primary Examiner.*

J. E. EVANS, *Assistant Examiner.*